United States Patent
Ko

(10) Patent No.: US 9,929,420 B2
(45) Date of Patent: Mar. 27, 2018

(54) VALVE DEVICE AND SYSTEM FOR CONTROLLING AIR FLOW OF FUEL CELL STACK

(71) Applicants: HYUNDAI MOTOR COMPANY, Seoul (KR); KIA MOTORS CORPORATION, Seoul (KR)

(72) Inventor: Jae Jun Ko, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/374,507

(22) Filed: Dec. 9, 2016

(65) Prior Publication Data

US 2018/0013157 A1 Jan. 11, 2018

(30) Foreign Application Priority Data

Jul. 5, 2016 (KR) .................. 10-2016-0084850

(51) Int. Cl.
| | |
|---|---|
| H01M 8/04089 | (2016.01) |
| H01M 8/04746 | (2016.01) |
| H01M 8/04082 | (2016.01) |

(52) U.S. Cl.
CPC ... *H01M 8/04753* (2013.01); *H01M 8/04097* (2013.01); *H01M 8/04201* (2013.01); *H01M 8/04761* (2013.01)

(58) Field of Classification Search
CPC ......... H01M 8/04089; H01M 8/04186; H01M 8/04753

See application file for complete search history.

(56) References Cited

U.S. PATENT DOCUMENTS

| | | |
|---|---|---|
| 2010/0323259 A1 | 12/2010 | Sung et al. |
| 2015/0136259 A1 | 5/2015 | Lallemant et al. |
| 2016/0141661 A1 | 5/2016 | Kim et al. |

FOREIGN PATENT DOCUMENTS

| | | |
|---|---|---|
| JP | 2010-073390 A | 4/2010 |
| KR | 20-0165917 Y1 | 2/2000 |
| KR | 10-2005-0066152 A | 6/2005 |
| KR | 10-2009-0097282 A | 9/2009 |
| KR | 10-2010-0136716 A | 12/2010 |
| KR | 10-1364144 81 | 2/2014 |
| KR | 10-2015-0010969 A | 1/2015 |
| KR | 10-2016-0057115 A | 5/2016 |

OTHER PUBLICATIONS

Korean Office Action issued in Application No. 10-2016-0084850 dated May 16, 2017.

*Primary Examiner* — Olatunji Godo
(74) *Attorney, Agent, or Firm* — McDermott Will & Emery LLP

(57) ABSTRACT

A valve device for controlling an air flow of a fuel cell stack includes: a housing connected to the fuel cell stack and including a plurality of manifolds formed therein; a disk rotatably provided in the housing to control the air flow of the fuel cell stack; and a central shaft provided at the center of the housing to rotate the disk.

11 Claims, 15 Drawing Sheets

VALVE DEVICE AND SYSTEM FOR CONTROLLING AIR FLOW OF FUEL CELL STACK

CROSS-REFERENCE TO RELATED APPLICATION

This application is based on and claims the benefit of priority to Korean Patent Application No. 10-2016-0084850, filed on Jul. 5, 2016 in the Korean Intellectual Property Office, the disclosure of which is incorporated herein in its entirety by reference.

TECHNICAL FIELD

The present disclosure relates to a valve device and a system for controlling an air flow of a fuel cell stack, and more particularly, to a valve device and a system for controlling an air flow of a fuel cell stack capable of improving an output and a driving endurance lifespan of the fuel cell stack.

BACKGROUND

Generally, a polymer electrolyte membrane fuel cell (PEMFC), which is a device generating electricity through an electrochemical reaction between hydrogen and oxygen, has efficiency higher than that of other types of fuel cells, has a current density and an output density larger than those of other types of fuel cells, has an ignition time shorter than that of other types of fuel cells, and uses a solid electrolyte, such that the electrolyte does not need to be managed. In addition, since a reaction product of the polymer electrolyte membrane fuel cell is pure water, the polymer electrolyte membrane fuel cell is an environmentally-friendly power source. Therefore, a study on the polymer electrolyte membrane fuel cell has been actively conducted in an automobile industry.

A fuel cell is a cell individually configured in order to obtain large power and having a voltage of 0.6 to 1V, and electrically large energy may be obtained by stacking several cells. A product in which individual cells are stacked one by one is called a fuel cell stack. Generally, three hundred or more cells may be stacked to drive a fuel cell vehicle.

Here, the cell in the fuel cell stack is configured to include a membrane-electrode assembly becoming a path of an electrochemical reaction and hydrogen ions, a separator moving a reaction gas and electrons, a gas diffusion layer uniformly diffusing the reaction gas to electrodes, and a gasket isolating hydrogen used as the reaction gas at the time of stacking the cells and a coolant used in order to cool air from each other and preventing the hydrogen and the coolant from being leaked to the outside. The membrane-electrode assembly is again divided into a membrane and the electrodes. A perfluorosulfonic acid based solid polymer is mainly used as a material of an electrolyte membrane used in the membrane-electrode assembly, and a thin membrane having a thickness of 10 to 30 μm is generally used in order to lower ion conductivity having a large influence on performance of the fuel cell.

In addition, the polymer electrolyte membrane fuel cell is generally driven at a temperature of −30 to 80° C. due to characteristics of a polymer membrane used in the polymer electrolyte membrane fuel cell. The polymer membrane needs to secure conductivity in order to implement high performance. A content of water has the largest influence on the conductivity. Therefore, humidification is made using a humidifier or through recirculation, in addition to water electrochemically generated in the fuel cell itself at the time of driving the fuel cell, and water management becomes an important driving strategy in order to constantly maintain water remaining in the fuel cell. However, an excessive amount of water present in the fuel cell has a negative influence on performance and endurance of the fuel cell at the time of driving the fuel cell. This is called flooding. In terms of performance, an excessive amount of water hinders the reaction gas from arriving at the electrodes to significantly increase a material transfer resistance, thereby decreasing performance and causing a cell voltage fluctuation. As a result, carbon corrosion of a cathode electrode as well as local carbon corrosion of an anode electrode may be caused, which may have a large influence on performance the fuel cell vehicle. Therefore, a countermeasure for preventing the problem described above is required.

To this end, a fuel cell system according to the related art may be a system in which a humidifier is mounted, as illustrated in FIG. 1. Water generated through an electrochemical reaction is utilized for humidification of a reaction gas through the humidifier, thereby making it possible to raise conductivity of an electrolyte membrane within a fuel cell stack. As a result, outputs of the fuel cell stack and the fuel cell system may be increased.

However, in the case in which the humidifier is mounted in the fuel cell system as described above, a structure of the fuel cell system becomes large due to a volume of the humidifier.

A non-humidified system in which an external humidifier is removed as illustrated in FIG. 2 has been developed in order to solve the problem described above. However, the non-humidified system may not more smoothly supply water as compared with the system in which the humidifier is mounted, such that efficiency is decreased.

SUMMARY

The present disclosure has been made to solve the above-mentioned problems occurring in the prior art while advantages achieved by the prior art are maintained intact.

An aspect of the present disclosure provides a valve device and a system for controlling an air flow of a fuel cell stack capable of improving an output and a driving endurance lifespan of the fuel cell stack by controlling the air flow of the fuel cell stack to allow water to be smoothly drained.

According to an exemplary embodiment of the present disclosure, a valve device for controlling an air flow of a fuel cell stack includes: a housing connected to the fuel cell stack and including a plurality of manifolds formed therein; a disk rotatably disposed in the housing to control the air flow of the fuel cell stack; and a central shaft disposed at a center of the housing to rotate the disk.

The housing may be connected to a blower to receive air supplied from the blower.

The fuel cell stack may have inlets which are connected to the manifolds of the housing and into which the air of the blower is introduced, and outlets through which the air is exhausted.

The inlets of the fuel cell stack may be formed at a lower portion of one end of the fuel cell stack, and the outlets of the fuel cell stack may be formed at an upper portion of another end of the fuel cell stack.

Each of the manifolds of the housing may include: an introduction part connected to the blower and into which the air is introduced; an inlet part connected to the inlet of the fuel cell stack at one end of the housing; an outlet part connected to the outlet of the fuel cell stack at another end of the housing; and an exhaust part disposed at an opposite end of the introduction part and exhausting the air.

Both ends of the disk with respect to the central shaft may be formed in a streamline shape.

The valve device may include a fixing plate disposed at a position spaced apart from the disk on the basis of the central shaft by a predetermined interval to have a double disk structure.

The disk may have a double disk structure including a first disk and a second disk.

The first disk and the second disk may be rotatable on the basis of the central shaft.

According to another exemplary embodiment of the present disclosure, a system for controlling an air flow of a fuel cell stack includes: the valve device controlling an air flow of a fuel cell stack described above and having a housing connected to the fuel cell stack and including a plurality of manifolds formed therein; a disk rotatably disposed in the housing to control the air flow of the fuel cell stack; and a central shaft disposed at a center of the housing to rotate the disk; a blower connected to the valve device to supply filtered air to the valve device for controlling the air flow of the fuel cell stack; and the fuel cell stack connected to the valve device for controlling an air flow of a fuel cell stack to supply or exhaust air through the valve device for controlling an air flow of a fuel cell stack, and generating power through an electrochemical reaction between hydrogen and the air.

The fuel cell stack may be connected to a pressure control valve controlling supply of the hydrogen, an exhaust valve controlling exhaust of the hydrogen, and a recirculation blower provided between the pressure control valve and the exhaust valve to recirculate the hydrogen.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Exemplary embodiments of the present disclosure will be described in detail with reference to the accompanying drawings.

Figure 1:
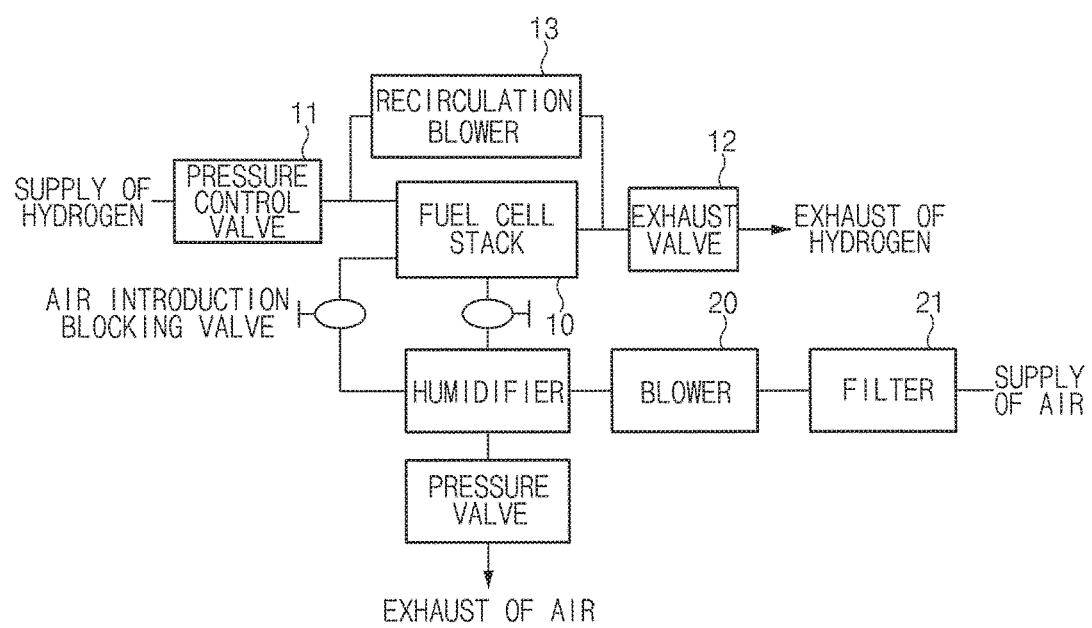
FIG. 1 is a view illustrating a structure of a fuel cell system according to the related art using a humidifier.
Figure 2:
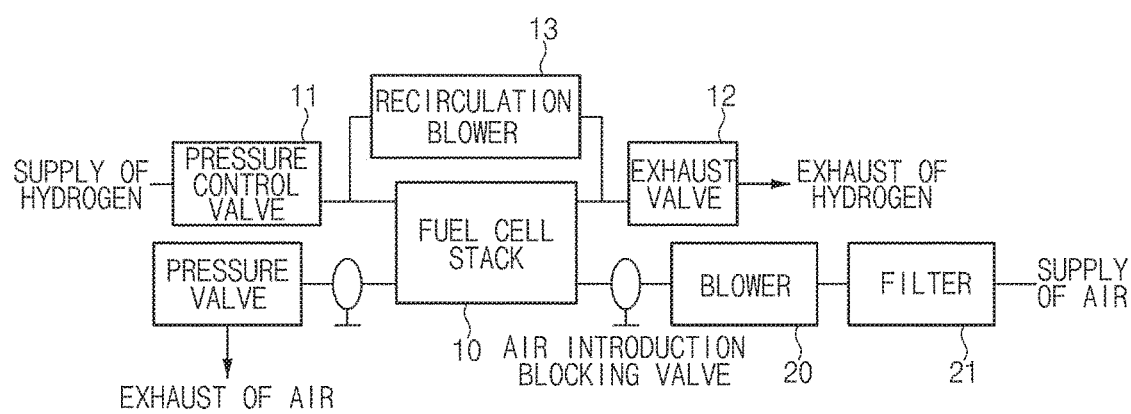
FIG. 2 is a view illustrating a structure of a fuel cell system according to the related art.
Figure 3:
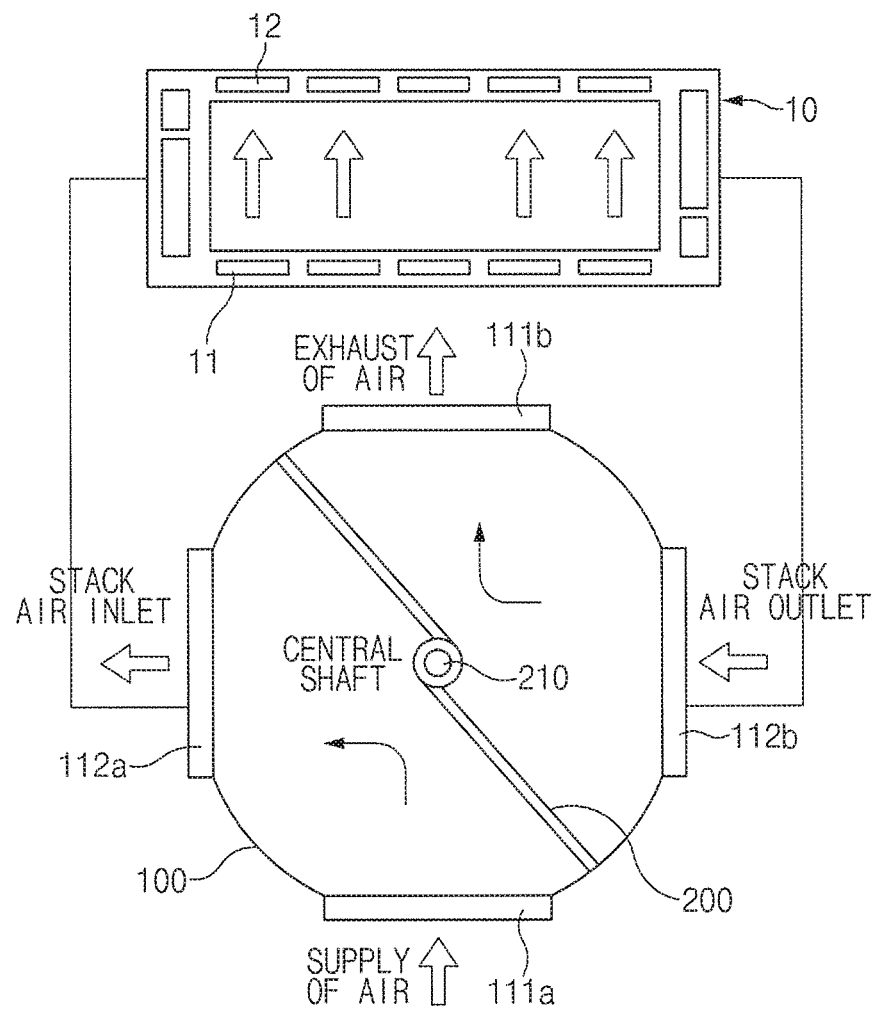
FIG. 3 is a view illustrating a position of a disk at a medium temperature a high temperature in a valve for controlling an air flow of a fuel cell stack according to an exemplary embodiment of the present disclosure.
Figure 4:
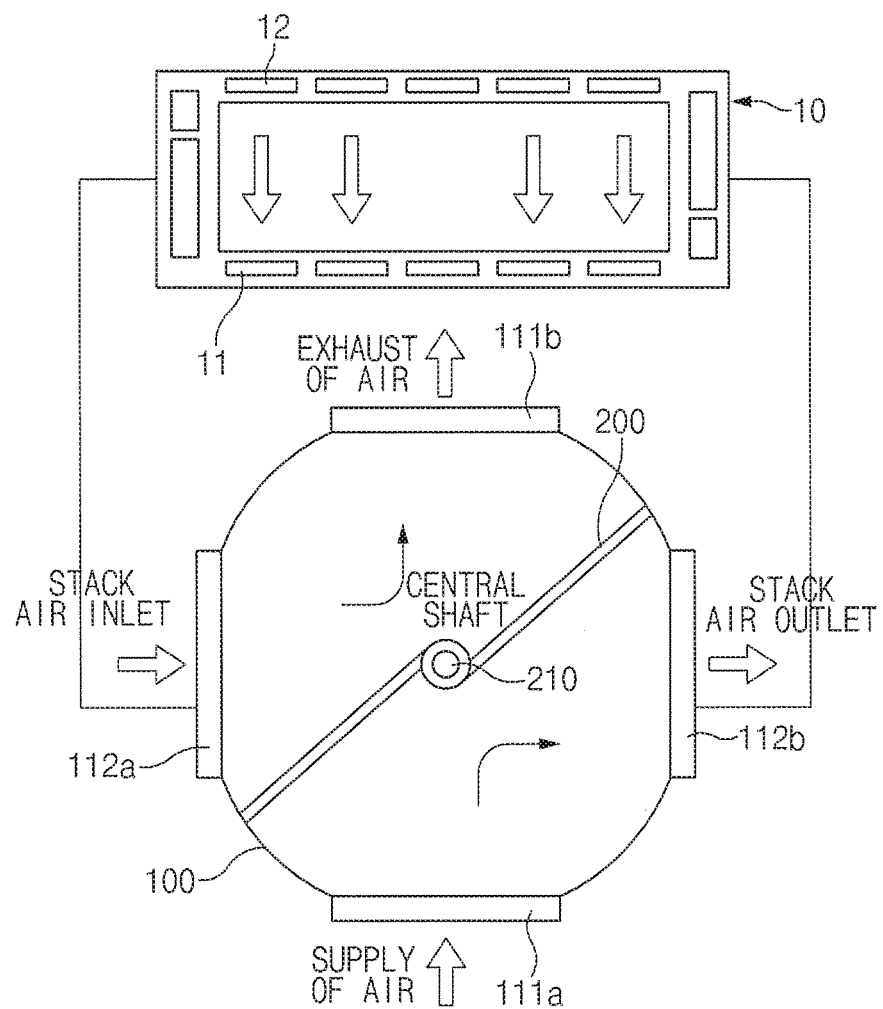
FIG. 4 is a view illustrating a position of a disk at a cold start or a low temperature in the valve for controlling an air flow of a fuel cell stack according to an exemplary embodiment of the present disclosure.

A valve device for controlling an air flow of a fuel cell stack according to an exemplary embodiment of the present disclosure is configured to include a housing 100 connected to a fuel cell stack 10, a disk 200 provided in the housing 100 and controlling an air flow, and a central shaft 210 rotating the disk 200, as illustrated in FIGS. 3 and 4.

The housing 100, which is a component forming an appearance of the valve device for controlling an air flow of a fuel cell stack according to an exemplary embodiment of the present disclosure, includes a plurality of manifolds, and is connected to the fuel cell stack 10 to enable supply and exhaust of air.

Here, the housing 100 may be connected to a blower 20 to receive air supplied from the blower 20 and supply the air to the fuel cell stack 10.

The fuel cell stack 10 has inlets 11 which are connected to the manifolds of the housing 100 and into which the air supplied from the blower 20 is introduced through the manifolds of the housing 100, and outlets 12 through which the introduced air is exhausted.

The disk 200, which is a component rotatably provided in the housing 100 and controlling the air flow of the fuel cell stack 10, transfers the air supplied from the blower 20 to the fuel cell stack 10 and exhausts the air exhausted from the fuel cell stack 10 through the manifolds of the housing 100.

The central shaft 210 is disposed at the center of the housing 100, and rotates the disk 200 to enable an air flow control of the fuel cell stack 10.

The inlets 11 into which the air is introduced are formed at a lower portion of one end of the fuel cell stack 10, and the outlets 12 through which the air is exhausted are formed at an upper portion of one end of the fuel cell stack 10.

Here, the manifold of the housing 100 includes an introduction part 111a into which the air is introduced, an exhaust part 111b through which the air is exhausted, and an inlet part 112a and an outlet part 112b connected to the fuel cell stack 10.

The introduction part 111a is connected to the blower 20 to allow the air to be introduced through the blower 20, and the exhaust part 111b is provided at the other end of the introduction part 111a to exhaust the air of the fuel cell stack 10.

In addition, the inlet part 112a is connected to the inlet 11 of the fuel cell stack 10 to introduce the air introduced through the introduction part 111a into the fuel cell stack 10, and the outlet part 112b is provided at the other end of the inlet part 112a and is connected to the outlet 12 of the fuel cell stack 10 to exhaust the air of the fuel cell stack 10 to the housing 100, thereby finally enabling exhaust of the air through the exhaust part 111b.

As described above, the present disclosure relates to the valve device for controlling an air flow of a fuel cell stack in which a humidifier is not used, and is used in order to increase fuel efficiency by maximizing fuel cell performance at a driving operation temperature. To this end, a valve for controlling an air flow is installed at the inlet 11 and the outlet 12 of the fuel cell stack 10, thereby making it possible to improve an output and a driving endurance lifespan of the fuel cell stack 10, and the disk 200 is added into the valve for controlling an air flow, thereby making it possible to perform a pressure varying function and a role of a shut-off valve for improving a start/stop endurance lifespan.

That is, the valve device for controlling an air flow of a fuel cell stack according to an exemplary embodiment of the present disclosure is configured to include the housing 100 in which the plurality of manifolds are formed, the disk 200 controlling the air follow, and the central shaft 210 rotating the disk 200, as described above, and is generally formed in a spherical shape in order to minimize a differential pressure and decrease a volume. Therefore, the disk 200 also has semi-circular shape.

Here, the valve device for controlling an air flow of a fuel cell stack according to an exemplary embodiment of the present disclosure separately includes a direction control member (not illustrated) for controlling the central shaft 210 to rotate the disk 200, and controls a rotation direction of the disk 200 connected to the central shaft 210 through the direction control member, thereby making it possible to supply the air in an upward direction within a separator of the fuel cell stack 10 as illustrated in FIG. 3 or controls the disk 200 to be rotated in an opposite direction, thereby making it possible to supply the air in a downward direction within the separator of the fuel cell stack 10 as illustrated in FIG. 4.

Figure 12:
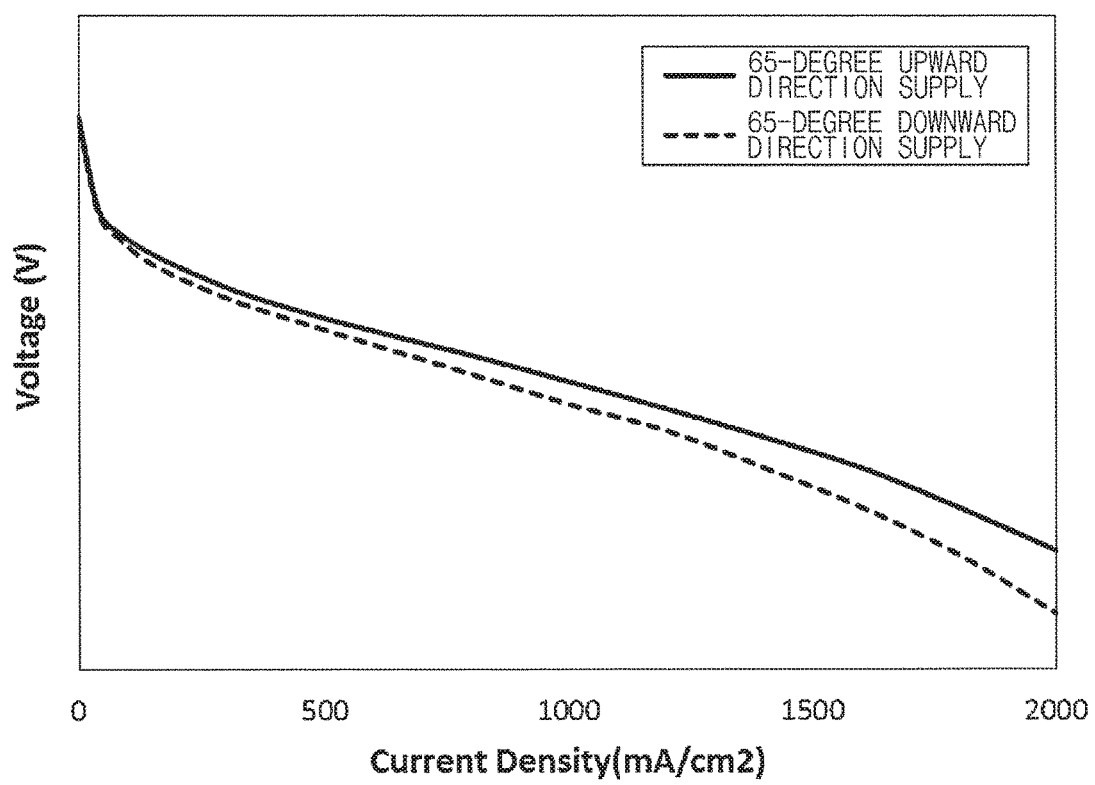
FIG. 12 is a graph for comparison of performance at the time of supplying air in a vertical direction in a general medium temperature driving condition of a fuel cell stack.
Figure 13:
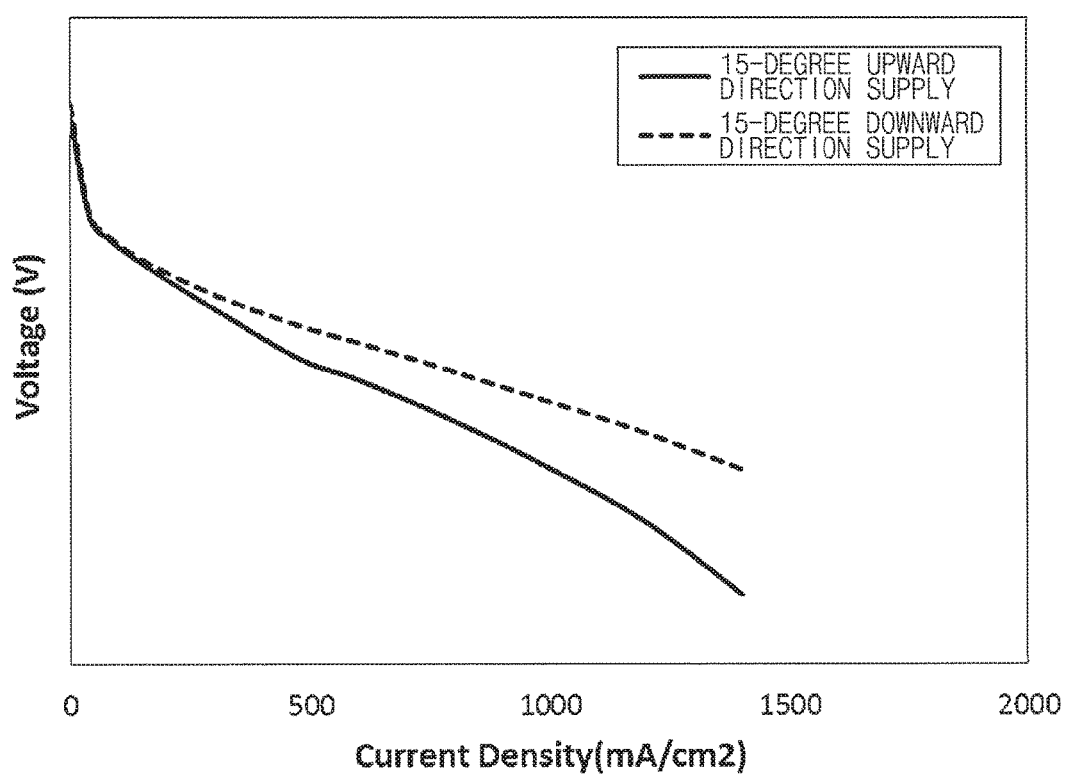
FIG. 13 is a graph for comparison of performance at the time of supplying air in a vertical direction in a driving condition of a fuel cell stack immediately after a cold start.

It may be appreciated that upward supply for supplying air from the bottom to the top generally shows higher performance at a driving temperature of a fuel cell stack as illustrated in FIG. 12, and it may be appreciated that downward supply shows higher performance at a driving temperature of the fuel cell stack appearing immediately after a cold start or at the time of raising a temperature as illustrated in FIG. 13.

Therefore, since performance is changed depending on a driving temperature, the present disclosure is characterized in that the valve device for controlling an air flow of a fuel cell stack capable of increasing the output and the driving endurance lifespan of the fuel cell stack 10 in an entire driving region is provided so as to accommodate an entire driving temperature. To this end, the disk 200 may be rotated through the direction control member (not illustrated) in the valve device for controlling an air flow of a fuel cell stack.

Figure 5:
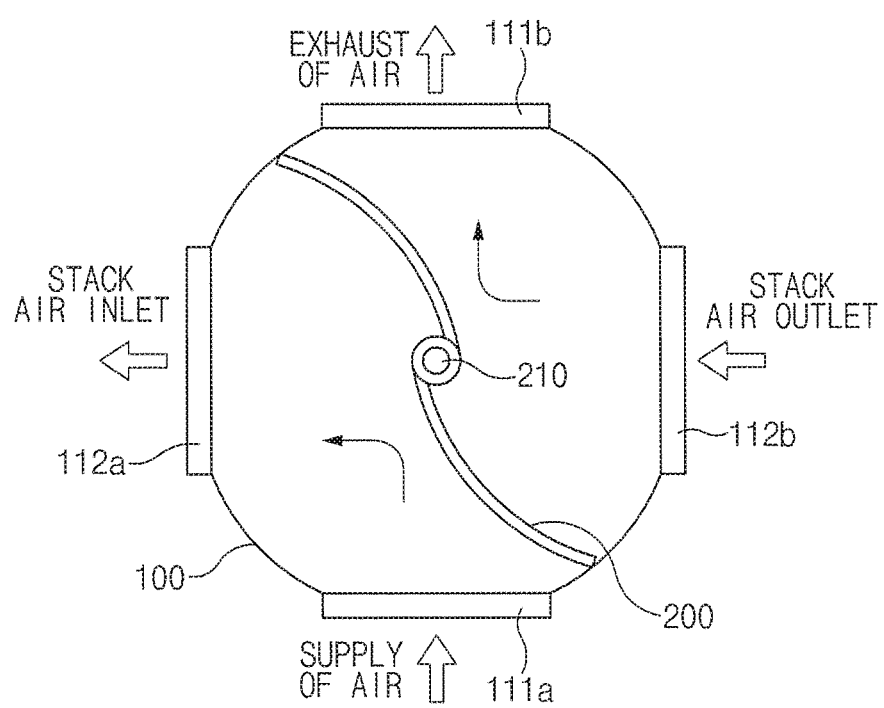
FIGS. 5 and 6 are views illustrating other examples of a disk in the valve for controlling an air flow of a fuel cell stack according to an exemplary embodiment of the present disclosure.
Figure 6:
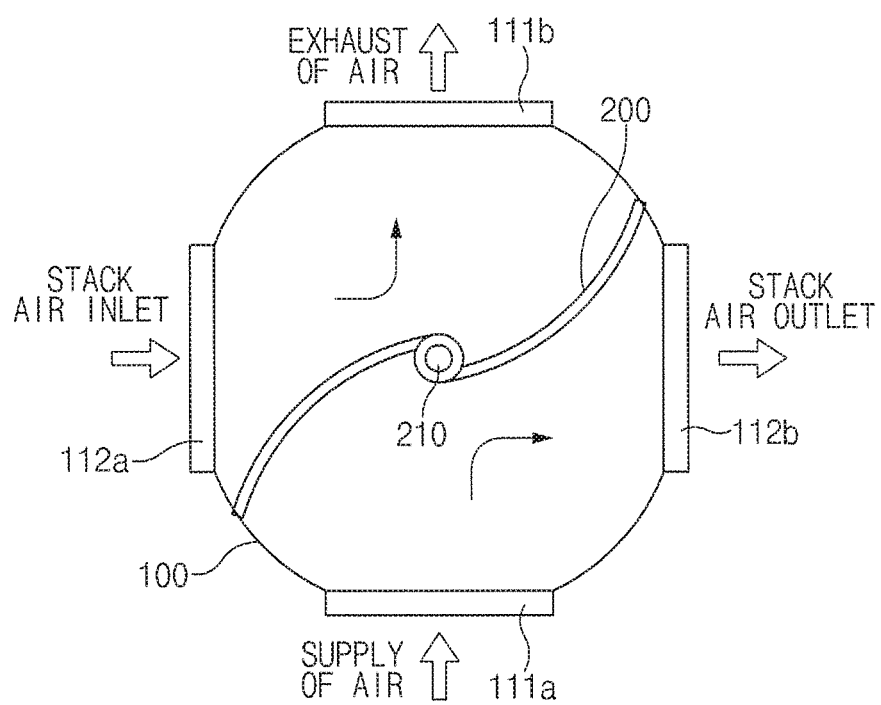

In another example of the disk 200 of the valve device for controlling an air flow of a fuel cell stack according to an exemplary embodiment of the present disclosure, as illustrated in FIGS. 5 and 6, both ends of the disk 200 on the basis of the central shaft 210 are formed in a streamline shape, thereby making it possible to minimize a volume and smooth an. air flow. Therefore, power consumption of the blower 20 may be decreased, and differential pressure characteristics may be generated.

Figure 7:
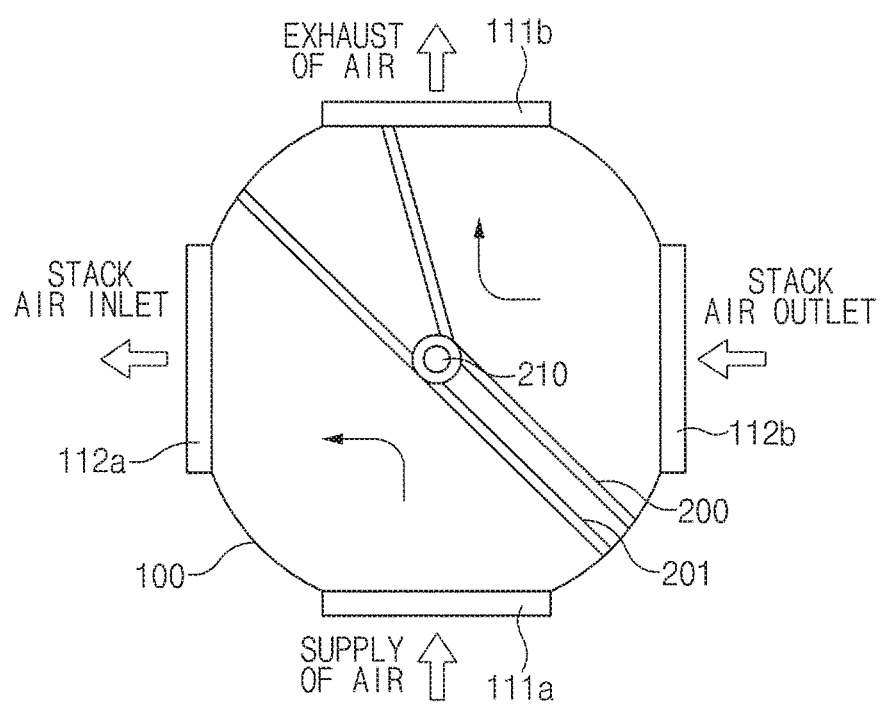
FIG. 7 is a view illustrating a position of a disk in which low pressing is required in an example of a double disk structure in the valve for controlling an air flow of a fuel cell stack according to an exemplary embodiment of the present disclosure.
Figure 8:
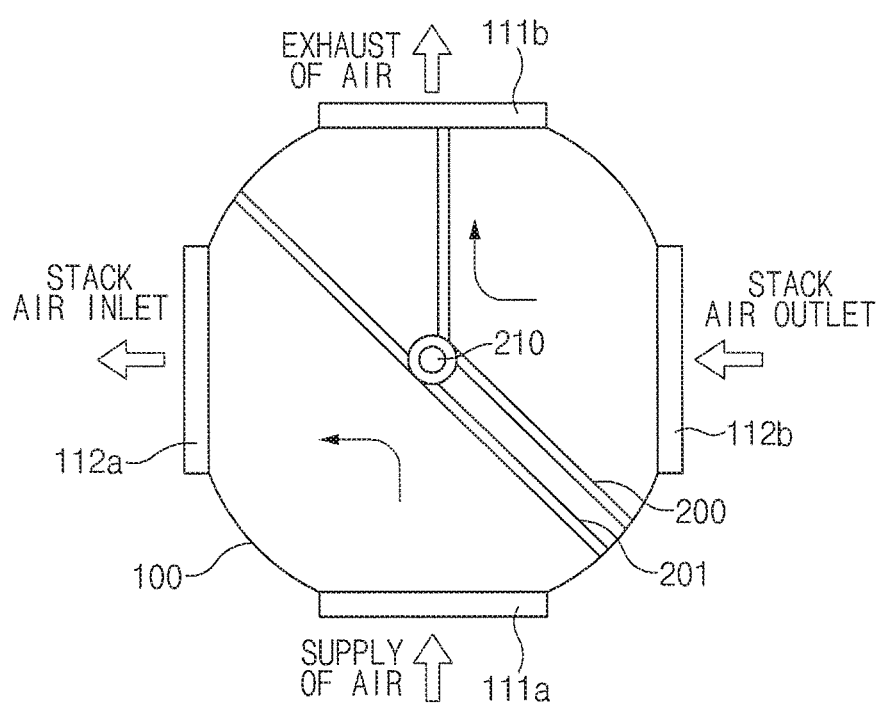
FIG. 8 is a view illustrating a position of a disk in which high pressing is rewired in an example of a double disk structure in the valve for controlling an air flow of a fuel cell stack according to an exemplary embodiment of the present disclosure.

In addition, in still another example of the disk 200 of the valve device for controlling an air flow of a fuel cell stack according to an exemplary embodiment of the present disclosure, the disk 200 may include a fixing plate 201. provided at a position spaced apart from the disk 200 on the basis of the central shaft 210 by a predetermined interval to have a double disk structure, as illustrated in FIGS. 7 and 8.

When the disk 200 has the double disk structure described above, a plurality of disks 200 are controlled, respectively, to control a pressure of the fuel cell stack 10 in driving the fuel cell stack 10, such that angles of the disks 200 at portions at which the air is exhausted at positions of the disks 200 in the valve device for controlling an air flow of a fuel cell stack in a normal temperature condition are changed, thereby making it possible to generate a differential pressure and generate a higher differential pressure through a control of the angles. That is, the disk 200 is positioned as illustrated in FIG. 7 in a system requiring low pressing, and is positioned as illustrated in FIG. 8 in a system requiring high pressing, such that a pressure may be controlled.

Figure 9:
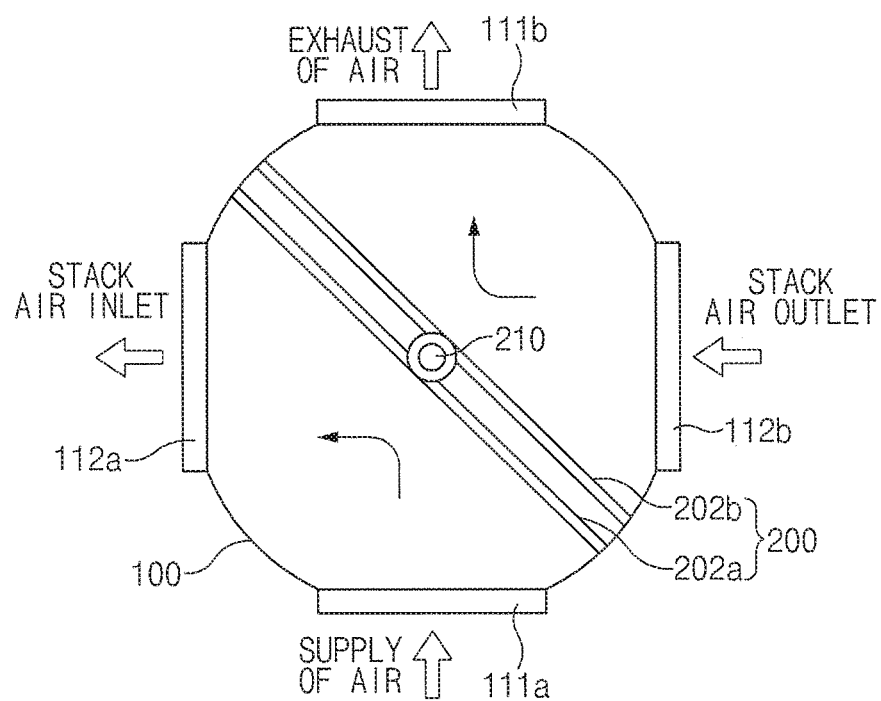
FIG. 9 is a view illustrating a position of a disk in a normal driving condition in another example of a double disk structure in the valve for controlling an air flow of a fuel cell stack according to an exemplary embodiment of the present disclosure.
Figure 10:
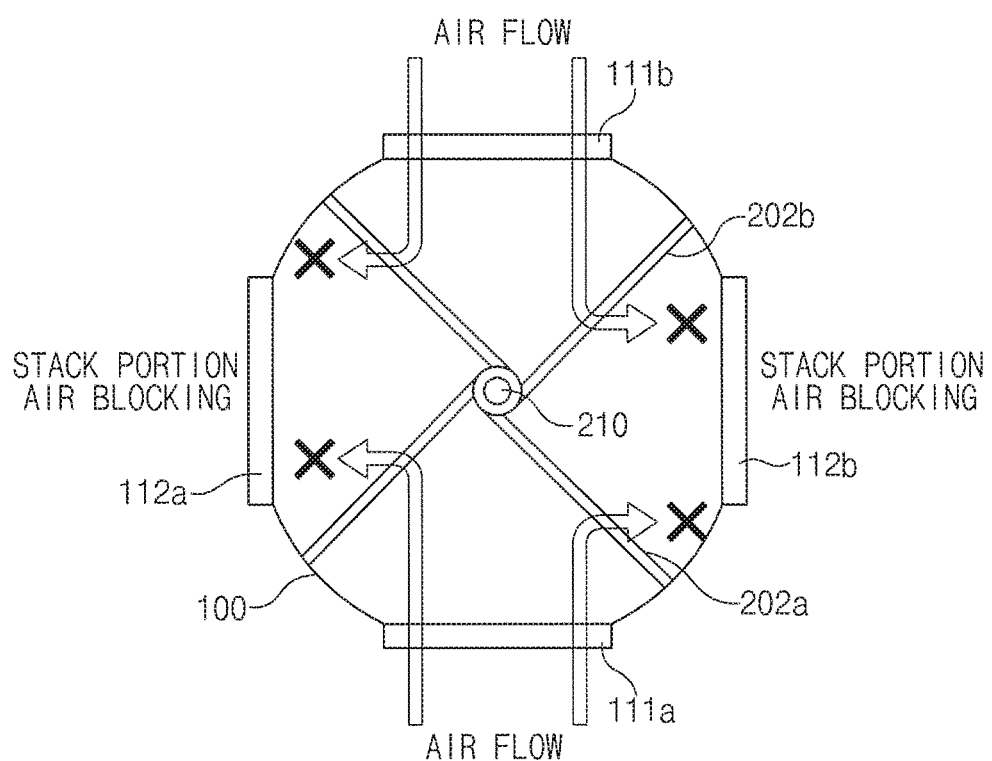
FIG. 10 is a view illustrating a position of a disk in a condition after a driving stop in another example of a double disk structure in the valve for controlling an air flow of a fuel cell stack according to an exemplary embodiment of the present disclosure.

In addition, in still another example of the disk 200 of the valve device for controlling an air flow of a fuel cell stack according to an exemplary embodiment of the present disclosure, the disk 200 may have a double disk structure including a first disk 202a and a second disk 202b and the first disk 202a and the second disk 202b are rotatable on the basis of the central shaft 210, as illustrated in FIGS. 9 and 10.

When the disk 200 has the double disk structure described above, the disk 200 may block external air into the fuel cell stack 10, thereby making it possible to improve the start/stop endurance lifespan. That is, when driving of the fuel cell stack 10 is stopped in a form of a valve driven in a normal condition, a position of a double disk is changed from a position illustrated in FIG. 9 to a position illustrated in FIG. 10, such that the double disk blocks the introduction part 111a into which the air is introduced and the outlet part to block introduced air, thereby making it possible to improve an endurance lifespan for carbon corrosion of the fuel cell stack 10.

Figure 11:
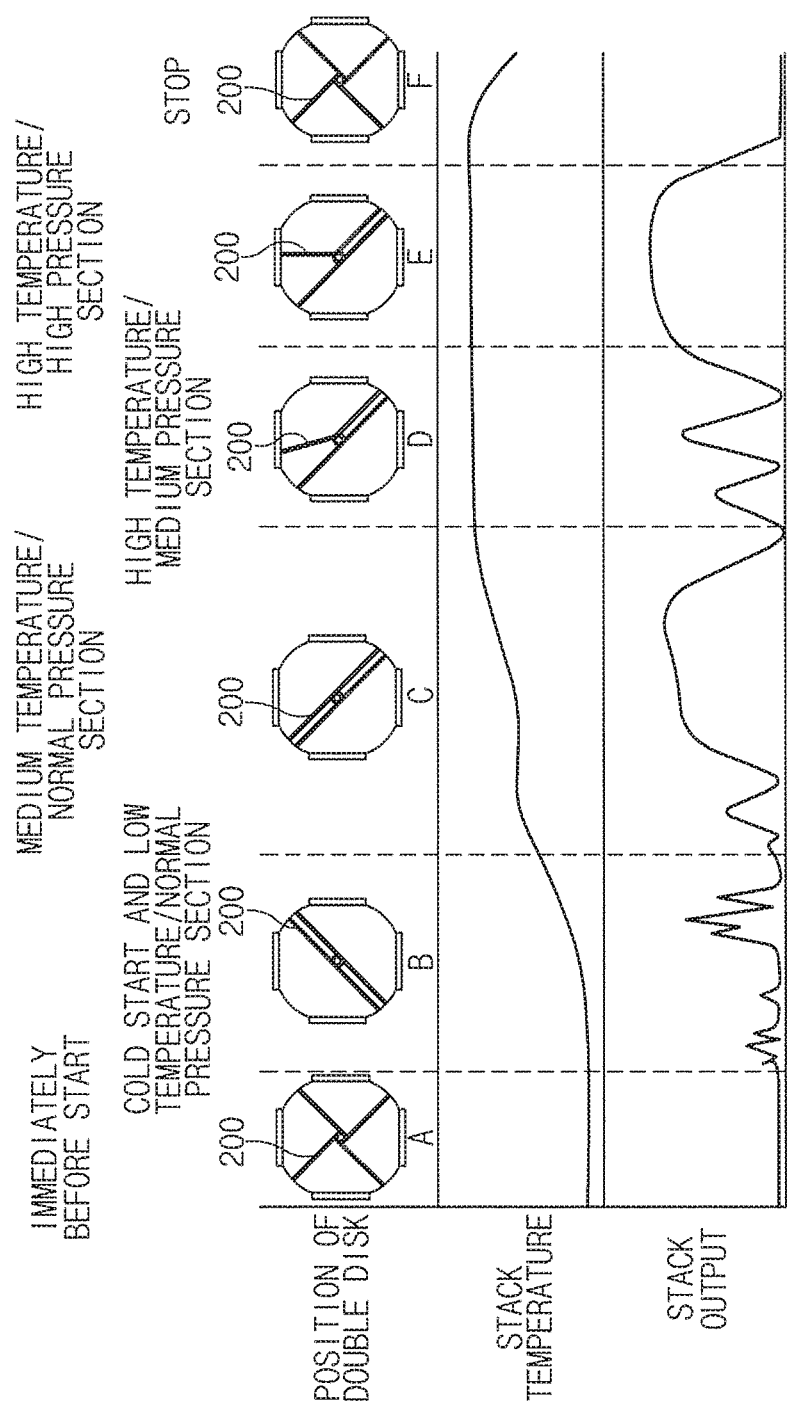
FIG. 11 is a view illustrating position characteristics of a disk in the valve for controlling an air flow of a fuel cell stack according to an exemplary embodiment of the present disclosure during driving of the fuel cell stack.

FIG. 11 is a view illustrating changes in a temperature and an output of the fuel cell stack 10 that may appear during general driving of the fuel cell stack, and positions of the disk 200 in the valve device for controlling an air flow of a fuel cell stack operated in this case. Positions of the double disk during driving of the fuel cell stack are as follows.

First, in a section immediately before a start, the disk 200 is positioned in an 'X' shape as illustrated in A of FIG. 11 in order to block external gas. In a cold start and low temperature/normal pressure section, the disk 200 is disposed in a shape as illustrated in B of FIG. 11 in order to supply air from an upper portion of a separator in a downward direction. In a medium temperature normal pressure section after raising a temperature, the disk 200 is disposed in a shape as illustrated in C of FIG. 11 since a position of the disk 200 is changed in order to supply air in an upward direction when a temperature rises to a predetermined temperature. In a high temperature/medium pressure or high pressure section, the disk 200 is controlled to be sufficiently opened as illustrated in D of FIG. 11 or be partially opened as illustrated in E of FIG. 11 since the high temperature/medium pressure or high pressure section is a section in which the fuel cell stack is driven in a pressure varying mode. In a stop section, the disk 200 is positioned in an 'X' shape as illustrated in F of FIG. 11 in order to block external air.

Figure 14:
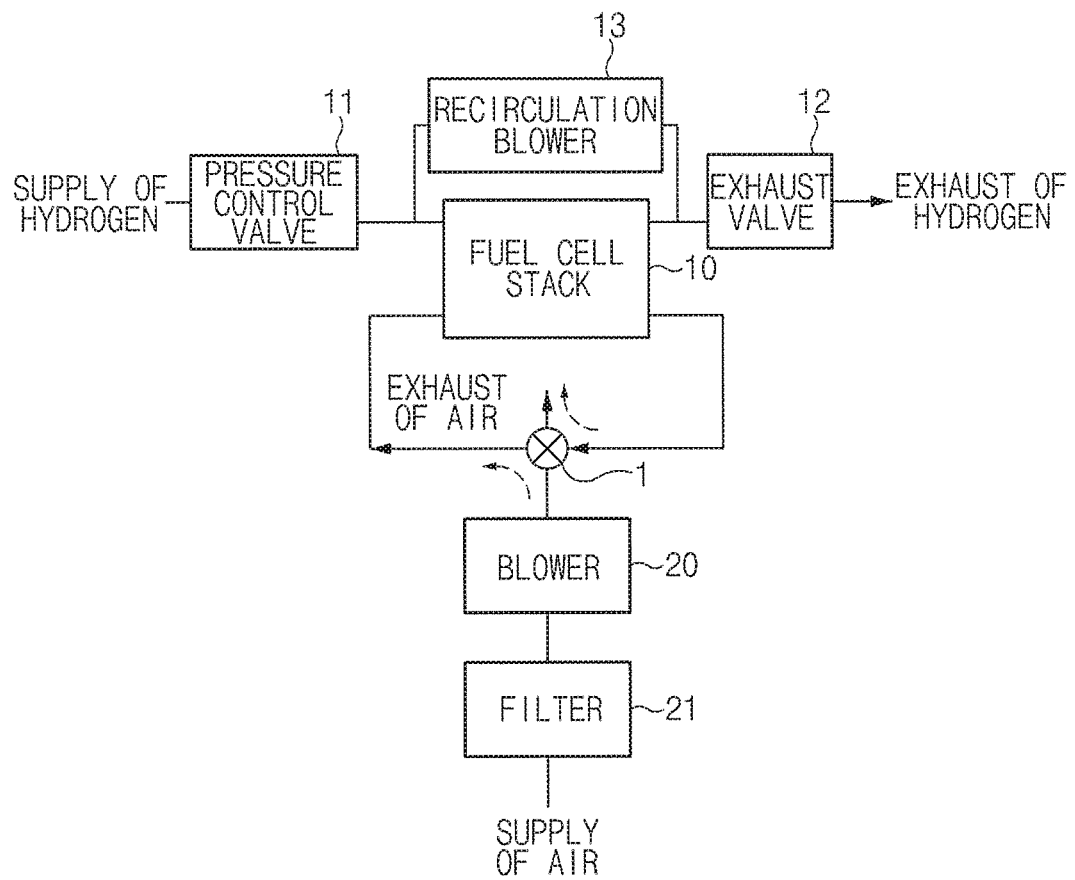
FIG. 14 is a view illustrating a structure of a valve device for controlling an air flow of a fuel cell stack that is being driven in medium temperature and high temperature conditions in a system for controlling an air flow of a fuel cell stack according to an exemplary embodiment of the present disclosure.
Figure 15:
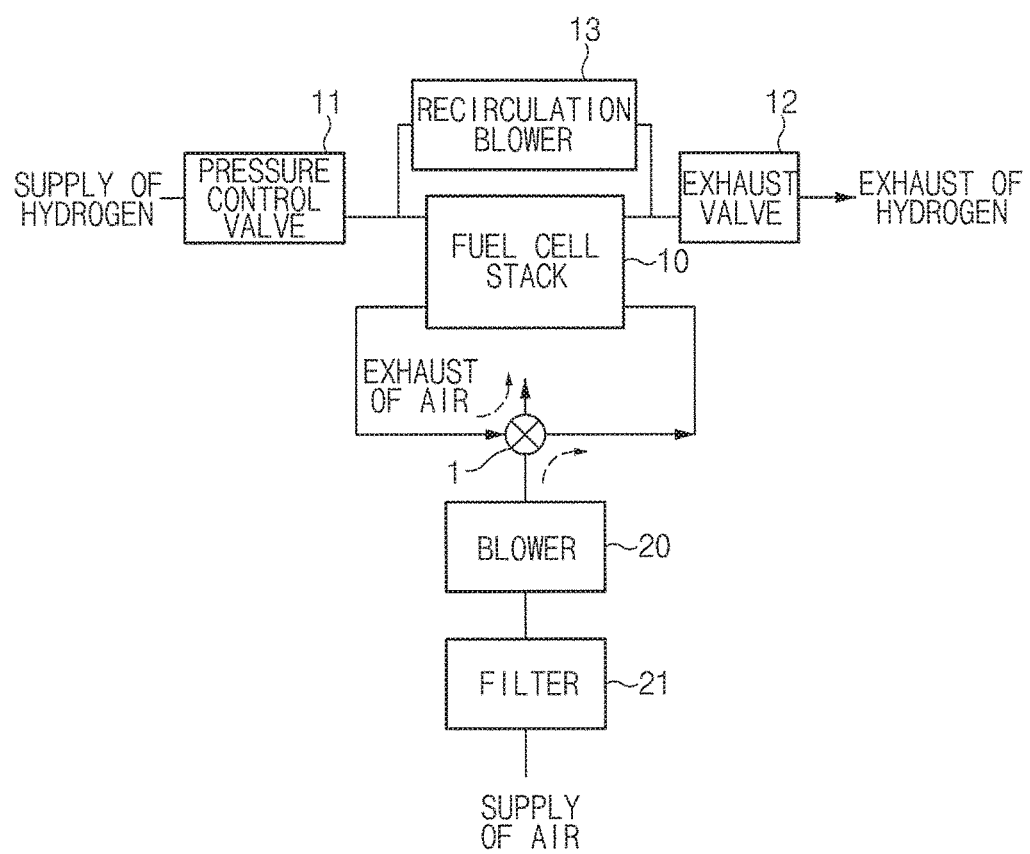
FIG. 15 is a view illustrating a structure of the valve device for controlling an air flow of a fuel cell stack that is being driven in low temperature and flooding conditions in the system for controlling an air flow of a fuel cell stack according to an exemplary embodiment of the present disclosure.

In addition, a system for controlling an air flow of a fuel cell stack according to an exemplary embodiment of the present disclosure is configured to include the valve device for controlling an air flow of a fuel cell stack 10, the blower 20 supplying air, and the fuel cell stack 10 supplying or exhausting the air through the valve device 1 for controlling an air flow of a fuel cell stack 10, as illustrated in FIGS. 14 and 15. Since the valve device 1 for controlling an air flow of a fuel cell stack 10, the blower 20, and the fuel cell stack 10 have been described in a description for the valve device for controlling an air flow of a fuel cell stack, a detailed description therefor will be omitted.

However, the blower 20 is connected to the valve device 1 for controlling an air flow of a fuel cell stack to supply air filtered by a filter 21 to the valve device 1 for controlling an air flow of a fuel cell stack.

The fuel cell stack 10 is connected to the valve device 1 for controlling an air flow of a fuel cell stack to supply or exhaust the air through the valve device 1 for controlling an air flow of a fuel cell stack, and generates power through an electrochemical reaction between hydrogen and the air.

Here, the fuel cell stack 10 is connected to a pressure control valve 11 controlling supply of the hydrogen, an exhaust valve 12 controlling exhaust of the hydrogen, and a recirculation blower 13 provided between the pressure control valve 11 and the exhaust valve 12 to recirculate the hydrogen.

That is, as illustrated in FIGS. 14 and 15, in the system for controlling an air flow of a fuel cell stack according to an exemplary embodiment of the present disclosure, the valve device 1 for controlling an air flow of a fuel cell stack is installed at a position of a humidifier of a fuel cell stack system according to the related art in which the humidifier is mounted, and determines a supply direction of the air when the air supplied by the blower 20 is supplied to the fuel cell stack 10.

Here, FIG. 14, which is a view illustrating a system for controlling an air flow of a fuel cell stack 10 that is being driven in medium temperature and high temperature conditions, illustrates an air flow showing higher performance and voltage stability in normal driving or high temperature driving, and the air flow may be controlled through the valve device 1 for controlling an air flow of a fuel cell stack. In addition, FIG. 15, which is a view illustrating a system for controlling an air flow of a fuel cell stack 10 that is being driven in low temperature and flooding conditions, illustrates an air flow direction showing particularly higher performance and stability at a lower temperature, and the air flow direction may be controlled as opposed to that of the system for controlling an air flow of a fuel cell stack as illustrated in FIG. 14 through the valve device 1 for controlling an air flow of a fuel cell stack. Through this, a maximum performance increase effect may be shown in an entire driving or temperature region, and fuel efficiency and endurance increases as well as an output increase may be shown.

As described above, the valve device for controlling an air flow of a fuel cell stack according to an exemplary embodiment of the present disclosure is configured to include the housing 100 connected to the fuel cell stack 10 and including the plurality of manifolds formed therein, the disk 200 rotatably provided in the housing 100 to control the air flow of the fuel cell stack 10, and the central shaft 210 provided at the center of the housing 100 to rotate the disk 200. Therefore, the air of the fuel cell stack 10 is supplied in the downward direction through the valve device 1 for controlling an air flow of a fuel cell stack at a low temperature to allow water to be smoothly drained, such that an output is increased, thereby making it possible to improve fuel efficiency, and allow the water to be smoothly drained at the low temperature, thereby making it possible to improve an endurance lifespan for carbon corrosion generated due to remaining water. In addition, the air of the fuel cell stack 10 is supplied in the upward direction through the valve device 1 for controlling an air flow of a fuel cell stack in a medium/high temperature or non (low)-humidified condition show high performance, thereby making it possible to improve an output and fuel efficiency.

In a temporary flooding condition, air is supplied in the downward direction through a valve, thereby making it possible to allow water to be rapidly and easily drained. In addition, the disk 200 is added into the valve to enable pressing in a cathode, thereby making it possible to implement a pressure varying system, and introduction of external air into the fuel cell stack 10 at the time of stopping the driving of the fuel cell stack 10 may be blocked using the added disk 200, thereby making it possible to minimize deterioration of the cathode such as carbon corrosion of the cathode due to start/stop.

As described above, in the exemplary embodiment of the present disclosure, the disk is provided in the valve for controlling an air flow connected to the fuel cell stack to control the air flow, thereby making it possible to allow the water to be smoothly drained. Therefore, the output is improved, thereby making it possible to improve the fuel efficiency. In addition, carbon corrosion due to the remaining water is prevented, thereby making it possible to improve the endurance lifespan, and introduction of the external air into the fuel cell stack at the time of stopping the driving of the fuel cell stack may be blocked through the added disk, thereby making it possible to minimize the deterioration such as the carbon corrosion due to the start stop.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A valve device for controlling an air flow of a fuel cell stack, the valve device comprising:
    a housing connected to the fuel cell stack and including a plurality of manifolds formed therein;
    a disk rotatably disposed in the housing to control the air flow of the fuel cell stack; and
    a central shaft disposed at a center of the housing to rotate the disk.

2. The valve device according to claim 1, wherein the housing is connected to a blower to receive air supplied from the blower.

3. The valve device according to claim 2, wherein the fuel cell stack has inlets which are connected to the manifolds of the housing and into which the air of the blower is introduced, and outlets through which the air is exhausted.

4. The valve device according to claim 3, wherein the inlets of the fuel cell stack are formed at a lower portion of one end of the fuel cell stack, and the outlets of the fuel cell stack are formed at an upper portion of another end of the fuel cell stack.

5. The valve device according to claim 3, wherein each of the manifolds of the housing includes:
   an introduction part connected to the blower and into which the air is introduced;
   an inlet part connected to the inlet of the fuel cell stack at one end of the housing;
   an outlet part connected to an outlet of the fuel cell stack at another end of the housing; and
   an exhaust part disposed at an opposite end of the introduction part and exhausting the air.

6. The valve device according to claim 1, wherein both ends of the disk with respect to the central shaft are formed in a streamline shape.

7. The valve device according to claim 1, further comprising: a fixing plate disposed at a position spaced apart from the disk with respect to the central shaft by a predetermined interval to have a double disk structure.

8. The valve device according to claim 1, wherein the disk has a double disk structure including a first disk and a second disk.

9. The valve device according to claim 8, wherein the first disk and the second disk are rotatable on the basis of the central shaft.

10. A system for controlling an air flow of a fuel cell stack, the system comprising:
    a valve device controlling an air flow of a fuel cell stack and comprising:
      a housing connected to the fuel cell stack and including a plurality of manifolds formed therein;
      a disk rotatably disposed in the housing to control the air flow of the fuel cell stack; and
      a central shaft disposed at a center of the housing to rotate the disk;
    a blower connected to the valve device to supply filtered air to the valve device for controlling the air flow of the fuel cell stack; and
    the fuel cell stack connected to the valve device for controlling an air flow of a fuel cell stack to supply or exhaust air through the valve device for controlling an air flow of a fuel cell stack, and generating power through an electrochemical reaction between hydrogen and the air.

11. The system according to claim 10, wherein the fuel cell stack is connected to a pressure control valve controlling supply of the hydrogen, an exhaust valve controlling exhaust of the hydrogen, and a recirculation blower provided between the pressure control valve and the exhaust valve to recirculate the hydrogen.

* * * * *